United States Patent Office 3,708,394
Patented Jan. 2, 1973

3,708,394
PROCESS FOR PRODUCING NICOTINAMIDE ADENINE DINUCLEOTIDE
Kiyoshi Nakayama, Sagamihara-shi, Japan, assignor to Kyowa Hakko Kogyo Co., Ltd., Tokyo, Japan
No Drawing. Continuation of application Ser. No. 657,057, July 31, 1967. This application June 17, 1968, Ser. No. 737,290
Claims priority, application Japan, Aug. 8, 1966, 41/51,663
Int. Cl. C12d 13/06
U.S. Cl. 195—28 N
10 Claims

ABSTRACT OF THE DISCLOSURE

A process for producing nicotinamide adenine dinucleotide which comprises culturing under aerobic conditions a microorganism capable of producing adenosine triphosphate from adenine in an aqueous nutrient medium comtaining from about 5% to about 20% by weight of at least one sugar as the main carbon source and from about 1.3% to about 3.0% by weight, as the concentration of $PO_4$, of a phosphoric acid compound, said culturing being carried out in the presence of (A) a compound selected from the group consisting of nicotinic acid, nicotinamide, nicotinic acid mononucleotide, nicotinic acid riboside, nicotinamide riboside, nicotinic acid adenine dinucleotide and mixtures thereof and (B) a compound selected from the group consisting of adenine, adenosine, adenosine monophosphate, adenosine diphosphate, adenosine triphosphate and mixtures thereof, and accumulating and recovering nicotinamide adenine dinucleotide from the resultant culture liquor. Preferred microorganisms employed in the process include bacteria belonging to the genera Brevibacterium, Corynebacterium, Arthrobacter and Micrococcus.

CROSS-REFERENCE TO RELATED APPLICATION

This application is a continuation of copending application Ser. No. 657,057, filed on July 31, 1967 and now abandoned.

The present invention relates to a process for producing nicotinamide adenine dinucleotide. More particularly, the invention relates to an improved process for producing nicotinamide adenine dinucleotide by fermentation with microorganisms.

Nicotinamide adenine dinucleotide can be found in yeasts, molds and bacteria. Accordingly, a process for producing nicotinamide adenine dinucleotide by extracting the raw material from microorganism cells and purifying the same is known in the prior art. Yet, this process has its disadvantages.

Nicotinamide adenine dinucleotide is a compound having an important role in biochemical reactions and is also useful in the alcoholic fermentation of glucose. Nicotinamide adenine dinucleotide, also known as coenzyme I, dehydrogenase coenzyme I, diphosphopyridine nucleotide and cozymase, has the following structural formula:

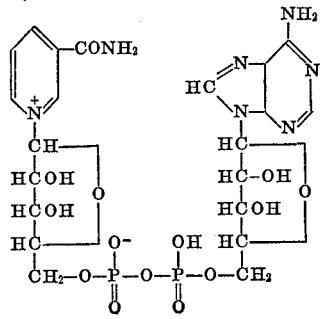

One of the objects of the present invention is to provide an improved process for the production of nicotinamide adenine dinucleotide which overcomes the disadvantages and deficiencies of the prior art methods.

Another object of the present invention is to provide a process for producing nicotinamide adenine dinucleotide by fermentation which may be carried out in an efficacious and simple manner.

A further object of the invention is to provide a process for producing nicotinamide adenine dinucleotide by fermentation which may be carried out advantageously on an industrial scale to give a high yield of product.

These and other objects and advantages of the present invention will become apparent to those skilled in the art from a consideration of the following specification and claims.

In accordance with the present invention, it has been found that microorganisms having particular properties, when cultured in culture media containing certain additives, are capable of producing large accumulations of nicotinamide adenine dinucleotide by fermentation. The nicotinamide adenine dinucleotide is formed extra-cellularly, not intracellularly. This represents a great advance over the processes of the prior art as the extraction of nicotinamide adenine dinucleotide from bacterial cells requires the mechanical and chemical rupturing of cell walls, as well as treatment for denaturation and destruction. The loss of nicotinamide adenine dinucleotide in these prior art processes is great and, in addition, a careful process control is also required for separation from the other bacterial cell components in the subsequent purification process. Accordingly, this prior art process is accompanied by many difficulties which are serious drawbacks to industrial practice.

The present invention overcomes these aforementioned difficulties. In the process of the present invention, nicotinamide adenine dinucleotide accumulates directly in the culture solution extra-cellularly, as noted above.

Particular microorganisms are to be used in the process of the present invention. Specifically, these are microorganisms which have the ability to produce adenosine triphosphate in the culture liquor when cultivated in the presence of adenine in the culture medium. Microorganisms which have this characteristic are broadly distributed and cannot be limited to microorganisms belonging to specific classification groups. However, superior strains can be obtained by the following selection method from soil, air, animal bodies and other natural isolates of microorganisms as well as from preserved strains. This selection is effected by transplanting the microorganism to be tested into a test tube containing 10 ml. of a culture medium having a composition consisting of 10% of glucose, 1% of $K_2HPO_4$, 1% of $KH_2PO_4$, 1% of $MgSO_4 \cdot 7H_2O$, 1% of yeast extract and 30 μg./l. of biotin and subjecting the same to culturing with aerobic shaking, to which adenine is added in a concentration of 2 mg./ml. after 48 hours of culturing. This is followed by a further 48 hours of culturing. Then, 0.01 ml. of supernatant of the culture liquor is spotted on a filter paper for paper chromatographic observation. Those microorganisms in which the production of adenosine triphosphate is detectable by irradiation with ultraviolet rays are selected for the process of the present invention.

Preferred microorganisms include bacteria belonging to the genera Brevibacterium, Corynebacterium, Arthrobacter and Micrococcus.

The composition of the fermentation medium is also important in the process of the present invention. The nutrient medium may be either a synthetic culture medium or a natural nutrient medium which contains the essential nutrients for the growth of the microorganism employed.

Such fermentation medium generally contains a carbon source, such as a carbohydrate, as well as other nutrients which are well known in the art such as, for example, a nitrogen source, inorganic compounds and the like which are utilized by the microorganism employed in specific amounts.

However, it is important that the culture medium contain at least one sugar in a concentration ranging from about 5% to about 20% by weight. This is a condition important for the extra-cellular accumulation of large amounts of nicotinamide adenine dinucleotide. Furthermore, it is important that the culture medium to be used contain phosphoric acid compounds in a range from about 1.3% to about 3.0% by weight, measured as the concentration of $PO_4$. It is also important for producing and accumulating large amounts of nicotinamide adenine dinucleotide in the culture liquor or intra-cellularly to add a compound selected from the group consisting of nicotinic acid, nicotinamide, nicotinic mononucleotide, nicotinic acid riboside, nicotinamide riboside, nicotinic acid adenine dinucleotide and mixtures thereof as well as a compound selected from the group consisting of adenine, adenosine, adenosine monophosphate, adenosine diphosphate, adenosine triphosphate and mixtures thereof to the culture medium at any time during the culturing process.

These additives may be added to the culture medium in varying concentrations. However, an optimum concentration is from about 2 mg./ml. to about 10 mg./ml. for each compound. It is possible to add the compounds of both groups simultaneously to the medium or to separately add the compounds of both groups one by one, for example, one just following the other. The important point is, that it is indispensable for accumulating remarkably large quantities of nicotinamide adenine dinucleotide in the culture liquor that two or more types of compounds selected from both groups be present in the culture medium during at least part of the fermentation process.

The carbohydrates which may be used in the process of the present invention include, for example, glucose, fructose, maltose, sucrose, starch, starch hydrolysate, molasses and the like. Small amounts of other suitable carbon sources such as glycerol, mannitol, sorbitol, organic acids, etc. may be used in the fermentation medium along with the carbohydrates. Such carbon sources may be used either singly or in mixtures of two or more.

Inorganic compounds which may be employed in the fermentation medium of the present invention include inorganic phosphates, for examples, potassium phosphate, ammonium phosphate, etc., or other inorganic materials such as magnesium sulfate, iron sulfate or other iron salts, potassium chloride, magnesium chloride, calcium chloride, etc.

As a nitrogen source, various kinds of inorganic or organic salts or compounds, such as urea or ammonium salts, for example, ammonium chloride, ammonium sulfate, ammonium nitrate, ammonium phosphate, etc., or natural substances containing nitrogen, such as cornsteep liquor, yeast extract, meat extract, fish meal, peptone, bouillon, casein hydrolysates, fish solubles, rice bran extract and the like may be employed. These substances may also be used either singly or in combinations of two or more. It may also be necessary to add certain essential nutrients to the culture medium, depending upon the particular microorganism employed, such as, amino acids, for example, aspartic acid, threonine, methionine, etc., and/or vitamins, for example, biotin, thiamine, cobalamin and the like.

Fermentation is conducted under aerobic conditions, such as aerobic shaking of the culture or with stirring of a submerged culture. An incubation temperature of about 20° to 40° C. and a pH of about 5 to 9 are preferable. Other temperature and pH conditions may also be used with lower yields. Remarkably large amounts of nicotinamide adenine dinucleotide are found to be accumulated in the fermentation liquor.

After the completion of the fermentation, the nicotinamide adenine dinucleotide may be separated from the culture liquor by conventional means, such as ion exchange resin treatment, precipitation with metallic salts, extraction methods, conventional adsorption methods, chromatography and the like.

The following examples are given merely as illustrative of the present invention and are not to be considered as limiting. Unless otherwise noted, the percentages in the application and in the examples are by weight.

Example 1

Corynebacterium sp. No. 3485 ATCC 21084 is used as the seed strain. A seed culture is obtained by culturing this strain at 30° C. under aerobic conditions for 24 hours in a culture medium consisting of 2% of glucose, 1% of peptone, 1% of yeast extract, 0.3% of NaCl and 30 µg./l. of biotin. It is then transplanted in a ratio of 10% by volume to a fermentation culture medium having the following composition (per liter of water):

120 g. glucose
6 g. urea
12 g. $K_2HPO_4$
12 g. $KH_2PO_4$
12 g. $MgSO_4 \cdot 7H_2O$
10 g. yeast extract
30 µg. biotin Only the urea is sterilized separately as a 12% solution. Nineteen ml. portions of an aqueous solution of the other culture medium components are poured into individual flasks and sterilized in an autoclave at 1 kg./cm.$^2$ for ten minutes. Then, 1 ml. portions of the sterilized urea solution are added before transplantation of the seed culture medium.

After transplantation, 20 ml. portions of both culture media are poured into conical flasks having a capacity of 250 ml. Culturing is then carried out with aerobic shaking at 30° C.

After 72 hours of culturing, the compounds shown in Table 1 are added to the culture medium in a concentration of 3 mg./ml., respectively. Culturing is then carried out for another 48 hours. The amount of nicotinamide adenine dinucleotide produced and accumulated in the resultant culture liquor is shown in Table 1 for each fermented solution. The nicotinamide adenine dinucleotide is recovered from the fermentation broth by an ion exchange resin treatment.

TABLE 1

| Compounds added | Nicotinamide adenine dinucleotide (mg./ml.) |
| --- | --- |
| Nicotinic acid plus adenine | 4.5 |
| Nicotinic acid plus adenosine | 4.5 |
| Nicotinic acid plus adenosine monophosphate | 4.5 |
| Nicotinic acid plus adenosine diphosphate | 4.5 |
| Nicotinic acid plus adenosine triphosphate | 5.2 |
| Nicotinamide plus adenine | 4.6 |
| Nicotinamide plus adenosine | 4.5 |
| Nicotinamide plus adenosine monophosphate | 4.4 |
| Nicotinamide plus adenosine diphosphate | 4.3 |
| Nicotinamdie plus adenosine triphosphate | 6.2 |
| Nicotinic acid mononucleotide plus adenine | 4.3 |
| Nicotinic acid mononucleotide plus adenosine | 4.1 |
| Nicotinic acid mononucleotide plus adenosine monophosphate | 4.2 |
| Nicotinic acid mononucleotide plus adenosine diphosphate | 4.3 |
| Nicotinic acid mononucleotide plus adenosine triphosphate | 5.1 |
| Nicotinamide mononucleotide plus adenine | 5.0 |
| Nicotinamide mononucleotide plus adenosine | 5.1 |
| Nicotinamide nononucleotide plus adenosine monophosphate | 4.2 |
| Nicotinamide mononucleotide plus adenosine diphosphate | 4.7 |
| Nicotinamide nomonucleotide plus adenosine triphosphate | 4.4 |
| Nicotinic acid riboside plus adenine | 5.8 |
| Nicotinic acid riboside plus adenosine | 5.2 |
| Nicotinic acid riboside plus adenosine monophosphate | 5.1 |
| Nicotinic acid riboside plus adenosine diphosphate | 5.1 |

TABLE 1—Continued

| Compounds added | Nicotinamide adenine dinucleotide (mg./ml.) |
|---|---|
| Nicotinic acid riboside plus adenosine triphosphate | 4.2 |
| Nicotinamide riboside plus adenine | 4.2 |
| Nicotinamide riboside plus adenosine | 4.2 |
| Nicotinamide riboside plus adenosine monophosphate | 4.3 |
| Nicotinamide riboside plus adenosine diphosphate | 4.3 |
| Nicotinamide riboside plus adenosine triphosphate | 4.7 |
| Nicotinic acid adenine dinucleotide plus adenine | 4.8 |
| Nicotinic acid adenine dinucleotide plus adenosine | 5.1 |
| Nicotinic acid adenine dinucleotide plus adenosine monophosphate | 4.2 |
| Nicotinic acid adenine dinucleotide plus adenosine diphosphate | 4.2 |
| Nicotinic acid adenine dinucleotide plus adenosine triphosphate | 6.3 |
| Nothing added | <0.1 |

When culturing is carried out by changing the glucose concentration to 3% and by altering the concentration of $K_2HPO_4$ and of $KH_2PO_4$ to 0.2%, respectively, while maintaining the other conditions of culturing the same as mentioned above, the amount of nicotinamide adenine dinucleotide produced is less than 1.5 mg./ml.

Example 2

Culturing is carried out in the same media and under the same conditions as described in Example 1, except that *Brevibacterium ammoniagenes* ATCC 6872 is used as the microorganism. The amounts of nicotinamide adenine dinucleotide accumulated in the resultant fermented solutions are shown in Table 2.

TABLE 2

| Compounds added: | Nicotinamide adenine dinucleotide (mg./ml.) |
|---|---|
| Nicotinic acid+adenine | 6.1 |
| Nicotinamide+adenine | 5.1 |
| Nicotinic acid+adenosine triphosphate | 6.3 |
| Nicotinamide+adenosine triphosphate | 6.7 |
| Nothing added | <0.1 |

Example 3

Culturing is carried out as described in Example 1, except that Arthrobacter sp. No. 3486 ATCC 21085 is used as the microorganism. The amounts of nicotinamide adenine dinucleotide accumulated in the culture liquor at the completion of fermentation are shown in Table 3.

TABLE 3

| Compounds added: | Nicotinamide adenine dinucleotide (mg./ml.) |
|---|---|
| Nicotinic acid+adenine | 4.1 |
| Nicotinamide+adenine | 4.3 |
| Nicotinic acid+adenosine triphosphate | 4.3 |
| Nicotinamide+adenosine triphosphate | 4.8 |
| Nothing added | <0.1 |

Example 4

Culturing is again carried out in the same media and under the same conditions as described in Example 1, except that *Micrococcus sodonensis* ATCC 15932 is used as the microorganism. The amounts of nicotinamide adenine dinucleotide accumulated in the resultant culture liquor, after the addition of the various substances shown in Table 4, are shown hereinbelow.

TABLE 4

| Compounds added: | Nicotinamide adenine dinucleotide (mg./ml.) |
|---|---|
| Nicotinamide+adenine | 1.4 |
| Nicotinamide+adenosine triphosphate | 2.1 |
| Nothing added | <0.1 |

The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. A process for producing nicotinamide adenine dinucleotide which comprises culturing under aerobic conditions a microorganism selected from the group consisting of *Brevibacterium ammoniagenes*, Corynebacterium sp. ATCC 21084, Arthrobacter sp. ATCC 21085 and *Micrococcus sodonensis* in an aqueous nutrient medium containing from about 5% to about 20% by weight of at least one sugar as the main carbon source and from about 1.3% to about 3.0% by weight, as the concentration of $PO_4$, of a phosphoric acid compound, said culturing being carried out in the presence of (A) a compound selected from the group consisting of nicotinic acid mononucleotide, nicotinic acid riboside, nicotinamide riboside, nicotinic acid adenine dinucleotide and mixtures thereof and (B) a compound selected from the group consisting of adenine, adenosine, adenosine monophosphate, adenosine diphosphate, adenosine triphosphate and mixtures thereof, and accumulating and recovering nicotinamide adenine dinucleotide from the resultant culture liquor.

2. The process of claim 1, wherein said microorganism is *Brevibacterium ammoniagenes* ATCC 6872.

3. The process of claim 1, wherein said microorganism is Corynebacterium sp. ATCC 21084.

4. The process of claim 1, wherein said microorganism is Arthrobacter sp. ATCC 21085.

5. The process of claim 1, wherein said microorganism is *Micrococcus sodonensis* ATCC 15932.

6. The process of claim 1, wherein the compound (A) and the compound (B) are added to the medium at the initiation of culturing.

7. The process of claim 1, wherein the compound (A) and the compound (B) are added to the medium after the initiation of culturing.

8. The process of claim 1, wherein the compound (A) and the compound (B) are each employed in an amount of from 2 mg./ml. to 10 mg./ml.

9. The process of claim 8, wherein culturing is carried out at a temperature of about 20° to 40° C. and at a pH of about 5 to 9.

10. The process of claim 1, wherein the nicotinamide dinucleotide is recovered from the culture liquor by an ion exchange resin treatment.

References Cited

UNITED STATES PATENTS 3,368,947   2/1968   Nakayama et al. ____ 195—28 N

ALVIN E. TANENHOLTZ, Primary Examiner

U.S. Cl. X.R.

195—114